April 28, 1970   D. R. McVAY   3,508,658
APPARATUS FOR CLEANING AND DRYING GASOLINE
Filed March 25, 1968   2 Sheets-Sheet 2

INVENTOR:
DONALD R. McVAY
BY Donald R. Johnson
ATTY.

United States Patent Office 3,508,658
Patented Apr. 28, 1970

3,508,658
APPARATUS FOR CLEANING AND DRYING GASOLINE
Donald R. McVay, Wilmington, Del., assignor to Sun Oil Company, Philadelphia, Pa., a corporation of New Jersey
Filed Mar. 25, 1968, Ser. No. 715,817
Int. Cl. B01d 27/02, 29/42, 35/18
U.S. Cl. 210—14                                       6 Claims

ABSTRACT OF THE DISCLOSURE

Apparatus for treating gasoline comprises a filter-coalescer device which removes solids from the gasoline and also coalesces the water entrained in the gasoline. The coalesced drops of water fall toward the bottom of the apparatus and accumulate there as a layer of water; when this water layer builds up to a certain depth, the water is removed to an evaporation chamber for disposal thereof.

---

This invention relates to apparatus for treating gasoline, and more particularly to apparatus for removing solid material and water therefrom.

In the dispensing of gasoline from a service station "pump" into the tank of an automobile, it is highly desirable to prevent any foreign solid particles or water from entering a customer's tank, since such may constitute a hazard to proper operation of the automobile.

An object of this invention is to provide a novel apparatus for cleaning and drying gasoline.

Another object is to provide, in a coalescer for removing water from gasoline, a simple, relatively inexpensive, and effective arrangement for disposing of the coalesced or collected water.

A further object is to provide a single unit which removes both solid, foreign particles and entrained water from gasoline, thus acting as a combined filter and coalescer unit.

The objects of this invention are accomplished, briefly, in the following manner: A housing assembly having an inlet and an outlet is arranged so that the same receives gasoline to be treated by way of its inlet, and the treated gasoline is fed to a suitable utilization means by way of its outlet. Within the housing assembly is positioned a filter-coalescer device through which the gasoline to be treated flows. The coalesced water drops are separated out from the treated gasoline moving to the housing assembly outlet and are directed to a sump located at the bottom of the housing assembly, by means of a baffle arrangement. A float-actuated valve drains water from the sump and allows it to flow out of the housing assembly into an evaporation chamber in the bottom of the assembly, where it is evaporated by heat.

A detailed description of the invention follows, taken in conjunction with the accompanying drawings, wherein.

Figure 1:
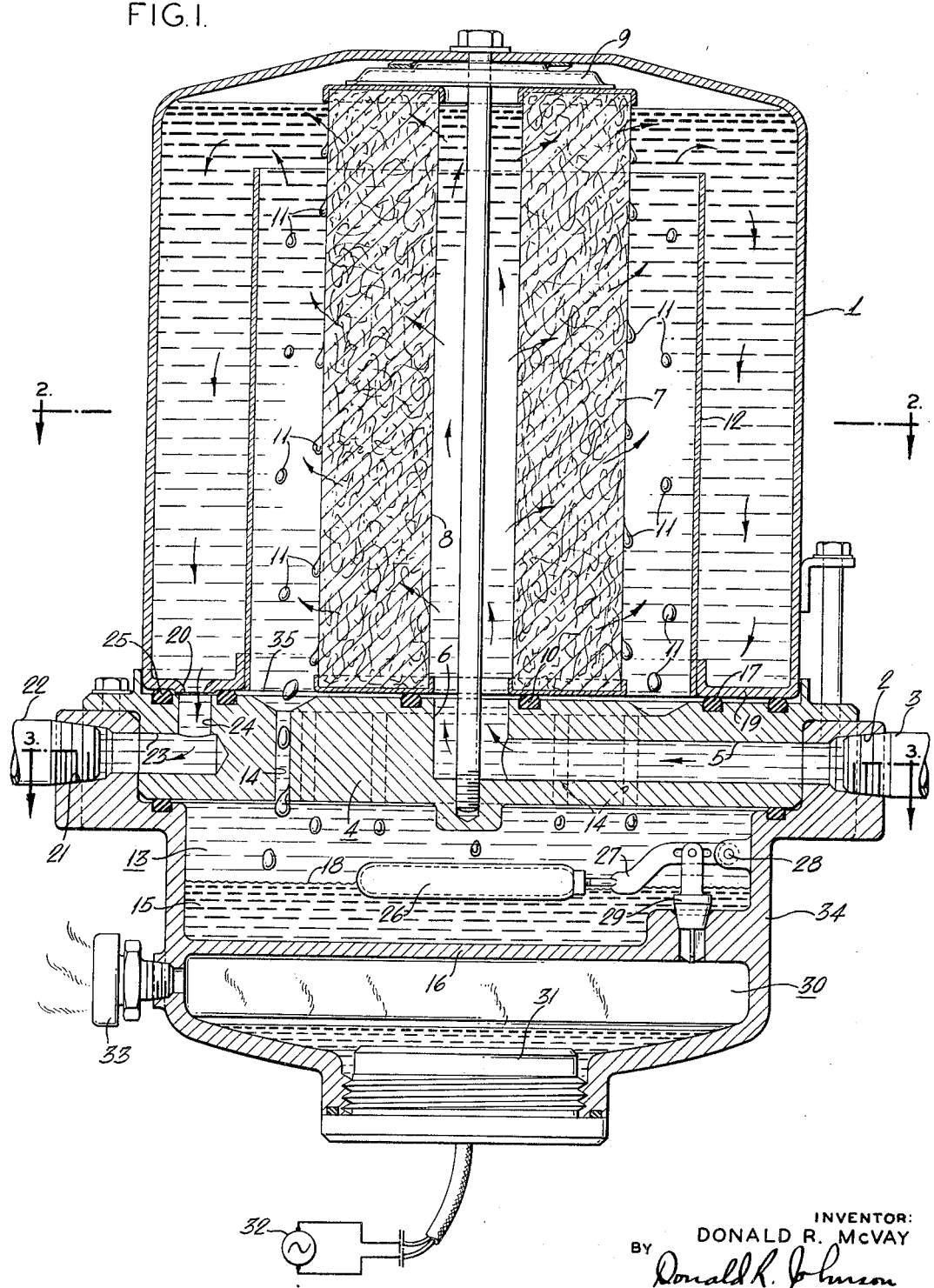
FIG. 1 is a central longitudinal section through a gasoline treating apparatus according to this invention.
Figure 2:
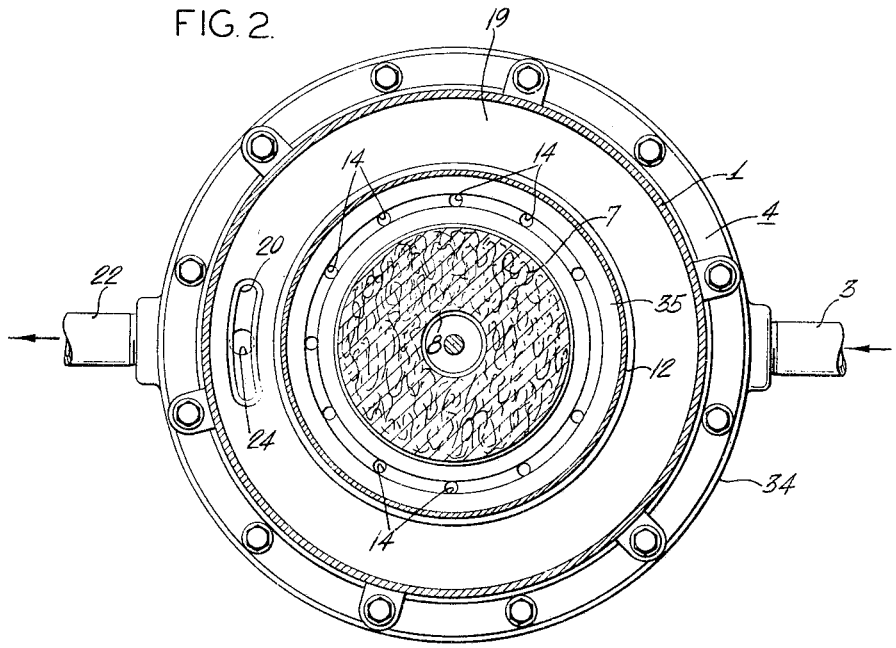
FIG. 2 is a transverse section taken on line 2—2 of FIG. 1.
Figure 3:
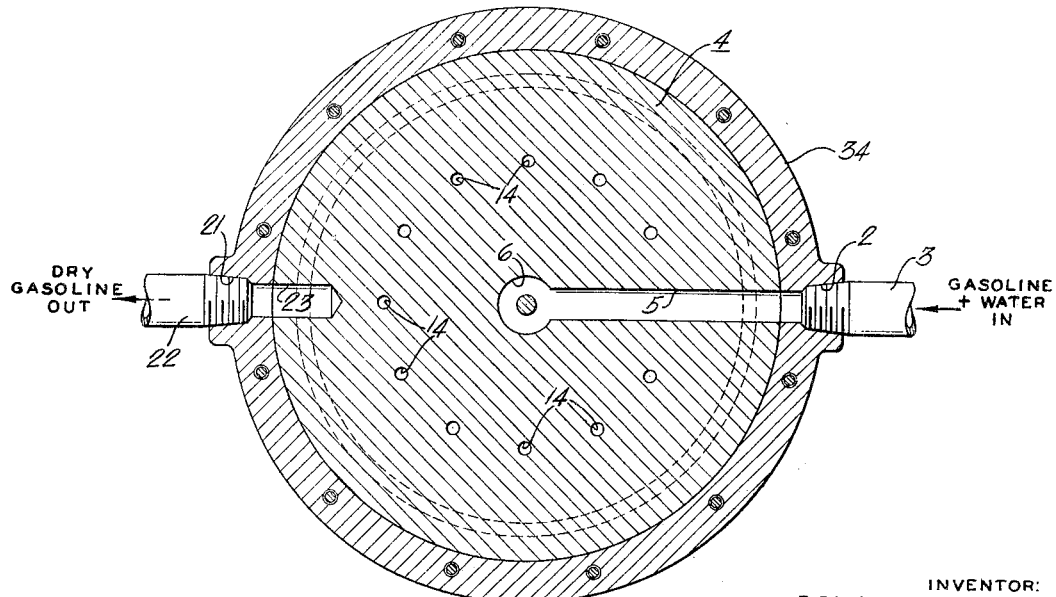
FIG. 3 is a transverse section taken on line 3—3 of FIG. 1.

Now referring to the drawings, the apparatus of this invention includes a vertically-disposed cylindrical upper housing 1 and an axially-aligned cylindrical lower housing 34, with a body 4 interposed between housings 1 and 34. The body 4 has certain passages therein (see FIG. 3). Items 1, 4, and 34 are suitably fastened together to constitute a housing assembly. A threaded inlet connection 2 for gasoline to be treated (i.e., for gasoline from which solid material and water are to be removed) is provided at the upper end of housing 34, and one end of an inlet pipe 3 is threaded into this connection 2, the other end of pipe 3 being coupled to the supply of untreated gasoline (which may be an underground storage receptacle). The gasoline to be treated may have therein a small percentage of water, seldom over 3% by volume, the water being entrained in the gasoline in the form of water droplets or slugs of free water, although in some cases it may be in emulsified form.

Body 4 has therein a radially-extending passage 5 of circular cross-section, whose outer end communicates with the inlet connection 2 (and thus with pipe 3), the inner end of passage 5 opening into a vertically-extending cylindrical central recess 6 drilled into body 4 from the upper surface thereof.

The lower end of the upper housing 1 is adapted to engage the upper surface of body 4, with the interposition of certain gaskets therebetween, as will be described hereinafter.

An elongated filter-coalescer cartridge 7 of cylindrical outer configuration is suitably mounted vertically and centrally in housing 1, this cartridge having a central longitudinal passage 8 therein of substantially the same diameter as recess 6 and longitudinally aligned therewith, the lower end of passage 8 communicating with said recess. An imperforate metallic cover plate 9 closes off and seals the upper end of passage 8. The liquid which enters the apparatus under pressure by way of inlet pipe 3 flows through passage 5 and recess 6 into passage 8, from whence it flows more or less radially outwardly through the material of cartridge 7. An annular or ring gasket 10, which is positioned between the adjacent surfaces of cartridge 7 and body 4 surrounding aperture 6, is utilized to prevent any leakage of untreated liquid past the cartridge 7.

The filter-coalescer cartridge 7 comprises a rather rigid mass or body of packed (compacted) fibrous hydrophilic material, such as the material known as "Fiberglas." This compacted mass provides a very great number of very small interstices; the exceedingly small passages through this mass are necessarily exceedingly tortuous. Because of these very fine tortuous passages through which the liquid must pass in its generally radially-outward travel through cartridge 7, a very efficient filtering action takes place, all of the solid particles (e.g., dirt, rust, etc.) which are contained in the untreated gasoline being removed by the filter 7; thus, the gasoline exiting from the outer surface of cartridge 7 is clean.

In addition to the filtering action described, the cartridge 7 acts to coalesce the water particles entrained in the gasoline, so that the water may be separated easily and effectively from the gasoline, and thus (where the apparatus of this invention is being used on a gasoline dispensing "pump") prevented from reaching a customer's automobile gasoline tank. In passing through the material of cartridge 7, tiny droplets of water entrained in the gasoline, or slugs of free water, merge with one another, forming larger ones, which in turn merge with others and so on until drops 11 of water are formed at or near the outer surface of cartridge 7, these drops being large enough to drop by their weight to a sump or collection chamber which will be described later. One possible theory of operation for the coalescing may be stated somewhat as follows. The material of cartridge 7 being hydrophilic, the water droplets tend to form a coating around the individual fibers of the cartridge, this coating then building up until it is extruded through the space between the fibers to form larger drops.

A baffle system, comprising an imperforate vertical cylindrical wall 12 made of thin metal and open at its upper and lower ends, which surrounds and is spaced from the cartridge 7, directs the coalesced water drops 11 to a sump or collection chamber 13 in the upper part of lower housing 34. As will be explained subsequently, the only way in which the treated gasoline can reach the outlet of the apparatus is by flowing upwardly and over the open upper end of baffle 12. The water drops 11 are too heavy to move upwardly in this manner, and as a result drop by their weight to the bottom of baffle 12. The drops of water pass downwardly through the annular space 35 between cartridge 7 and the inside of wall 12, and thence downwardly through a circular array of equiangularly-spaced small-diameter vertical bores 14 in body 4 to the collection chamber or sump 13, where they accumulate to form a layer 15 of coalesced water above a substantially horizontal integral partition 16 in lower housing 34. An annular or ring gasket 17, which is positioned at the lower end of wall 12 between housing 1 and the upper surface of body 4, is utilized (in conjunction with gasket 10, previously described) to make certain that the drops of water travel in the desired path to the sump 13.

It is deired to be pointed out that, in sump 13, the layer 15 of coalesced water builds up below the gasoline which is also in this sump or collection chamber, the wavy line 18 indicating the gasoline-water interface.

The annular region between the outside of wall 12 and the inside of the outer wall of housing 1 is closed at its lower end by an integral horizontal flange 19 in which there is cut an arcuate slot 20.

A threaded outlet connection 21 for treated (clean, dry) gasoline is provided at the upper end of housing 34, diametrically opposite to the threaded inlet connection 2. One end of an outlet pipe 22 is threaded into this connection, the other end of this pipe being coupled to a suitable utilization means for the treated (clean, dry) gasoline, such as a dispensing hose. Body 4 has therein a short radially extending passage 23 of circular cross-section, whose outer end communicates with the outlet connection 21 (and thus also with pipe 22), the inner end of passage 23 opening into a vertically-extending cylindrical recess 24 drilled into body 4 from the upper surface thereof; the center line of recess 24 is collinear with the center line of slot 20. An annular or ring gasket 25, which is positioned between the lower end of the outer wall of housing 1 and the upper surface of body 4, is utilized to confine the treated gasoline to the desired flow path.

The treated (clean, dry) gasoline which leaves the outer surface of cartridge 7 flows upwardly and over the top of baffle 12, and then downwardly through slot 20, recess 24, and passage 23 into outlet pipe 22, by way of which it leaves the apparatus; it may thus be seen that the treated gasoline can reach outlet pipe 22 only by flowing upwardly and over the top of baffle 12.

As described previously, the colesced water removed from the gasoline being treated accumulates as a layer 15 in the sump or collection chamber 13. A major problem associated with the use of coalescers, in the past, has been inexpensive disposal of the coalesced water. Running a line from sump 13 back to the underground storage tank (wherein the untreated gasoline is stored), in order to drain the collected water back into this tank, is much too expensive. An alternative might be to allow the service station attendant to drain the collected water, but this is considered unsafe by Underwriters' Laboratory, Inc. The apparatus of this invention includes a simple, effective, and safe arrangement for disposing of the coalesced, collected water; such arrangement will now be described.

A float 26, which sinks in gasoline and rises in water, is disposed in the central region of the sump 13; this float acts to follow up-and-down movements of the gasoline-water interface 18. Float 26 is rigidly attached to one end of a lever arm 27 whose opposite end is pivotally attached at 28 to the outer wall of the sump or collection chamber 13. A plug valve 29, which cooperates with a valve seat or opening provided in the partition 16, is rigidly attached to lever arm 27, near the pivoted end thereof. When float 26 moves upwardly, the plug valve 29 moves upwardly away from its seat, to allow water to drain out from sump 13 through this seat or opening, into an evaporation chamber 30 which is located in the lower portion of housing 34, below partition 16. Thus, when float 26 moves upwardly, valve 29 is opened by means of the lever mechanism described. The mechanical advantage resulting from the use of the lever reduces considerably the size of the float required.

As previously mentioned, lower housing 34 is divided by partitions 16 into an upper collection chamber 13 and a lower evaporation chamber 30. In the bottom of the chamber 30, there is mounted a constant temperature heating plate 31 which is energized from an alternating current electrical source 32 and is automatically maintained (by means of an explosion-proof thermostat, not shown, inside chamber 30) at a substantially constant temperature somewhere in the range of 100°–150° F. The temperature at which heating plate 31 is maintained is high enough to evaporate water drained from the sump 13 into the evaporation chamber 30, but low enough to avoid any gasoline explosion hazard. A vent arrangement 33 (which is preferably explosion-proof) is provided for evaporation chamber 30 to allow the escape of water vapor from this chamber.

In operation, untreated gasoline (for example, gasoline which is being pumped to a customer's tank, from a storage receptacle) enters the apparatus at 3 and passes through the filter-coalescer cartridge 7, where any solid particles and entrained water are removed. Clean, dry gasoline leaves the apparatus at 22 and is delivered to the customer.

The drops 11 of water move downwarly to the collection chamber or sump 13 and accumulate therein as coalesced water layer 15. When the accumulattd water 15 reaches a high enough level, float 26 moves and opens the valve 29. Water than drains to the evaporation chamber 30, where it is vaporized by heat and vented to the atmosphere at 33.

A rather widely-used type of gasoline dispensing "pump" has a filter unit associated therewith, the arrangement being such that the gasoline being dispensed passes through the filter unit prior to its entry into the dispensing hose leading to the customer's gasoline tank. The apparatus of this invention, which functions to both filter the gasoline and to coalesce and remove the water therefrom, is designed to replace the dispensing pump filter unit just described, with a minimum of installation problems. In fact, the apparatus of this invention could be installed by disconnecting the prior filter unit and replacing it with the unit of the present invention. The only important modification would be the running of an electrical cable for the constant temperature heating plate 31 in the evaporation chamber 30.

The invention claimed is:

1. Apparatus for treating gasoline by filtering the same and by separating water therefrom, comprising a vertically-elongated housing having an inlet near the bottom thereof for coupling to a supply of gasoline to be treated and also having an outlet near the bottom thereof for coupling to a treated gasoline utilization means; a single filter-coalescer device in said housing located above said inlet and said outlet, means in said housing for constraining the gasoline to be treated to flow from said inlet in a generally outward direction through said device, baffle means in said housing for constraining the treated gasoline to flow first in a generally upward direction out of said device and thence downwardly to said outlet, thereby to separate drops of water coalesced out of the treated gasoline and to cause such drops to accumulate in said housing in the form of a coalesced water layer, and means operating automatically, in response to an increase in the depth of said layer beyond a predetermined value, to withdraw coalesced water from said housing and to dispose of the same in a permanent manner.

2. Apparatus in accordance with claim 1, wherein said filter-coalescer device comprises a body of compacted fibrous hydrophilic material through which is passed the gasoline being treated.

3. Apparatus for treating gasoline by filtering the same and by separating water therefrom, comprising a housing having an inlet for coupling to a supply of gasoline to be treated and also having an outlet for coupling to a treated gasoline utilization means; a filter-coalescer device in said housing mounted between said inlet and said outlet, said device being constructed and arranged to both remove solid material from the gasoline being treated thereby and to coalesce small water droplets contained in the gasoline being treated into larger drops; means in said housing for separating said larger drops from the treated gasoline passed to said outlet and for causing such drops to accumulate in said housing in the form of a coalesced water layer, and means operating automatically, in response to an increase in the depth of said layer beyond a predetermined value, to withdraw coalesced water from said housing and to dispose of the same in a permanent manner, said last-mentioned means including means for evaporating the water withdrawn from said housing.

4. Apparatus defined in claim 3, wherein said separating means includes baffle means in said housing located between the outlet side of said device and the housing outlet.

5. Apparatus in accordance with claim 3, wherein said filter-coalescer device comprises a body of compacted fibrous hydrophilic material through which is passed the gasoline being treated .

6. Apparatus in accordance with claim 3, wherein said filter-coalescer device comprises a body of compacted fibrous hydrophilic material through which is passed the gasoline being treated, and wherein said separating means includes baffle means in said housing located between the outlet side of said device and the housing outlet.

References Cited

UNITED STATES PATENTS 3,187,895    6/1965    Pall et al. _____ 210—114

JAMES L. DECESARE, Primary Examiner

U.S. Cl. X.R.

210—180, 123, 305, 443